Sept. 12, 1950     E. N. FORSTER     2,522,260
WHEEL BALANCER
Filed Sept. 25, 1946     2 Sheets-Sheet 1
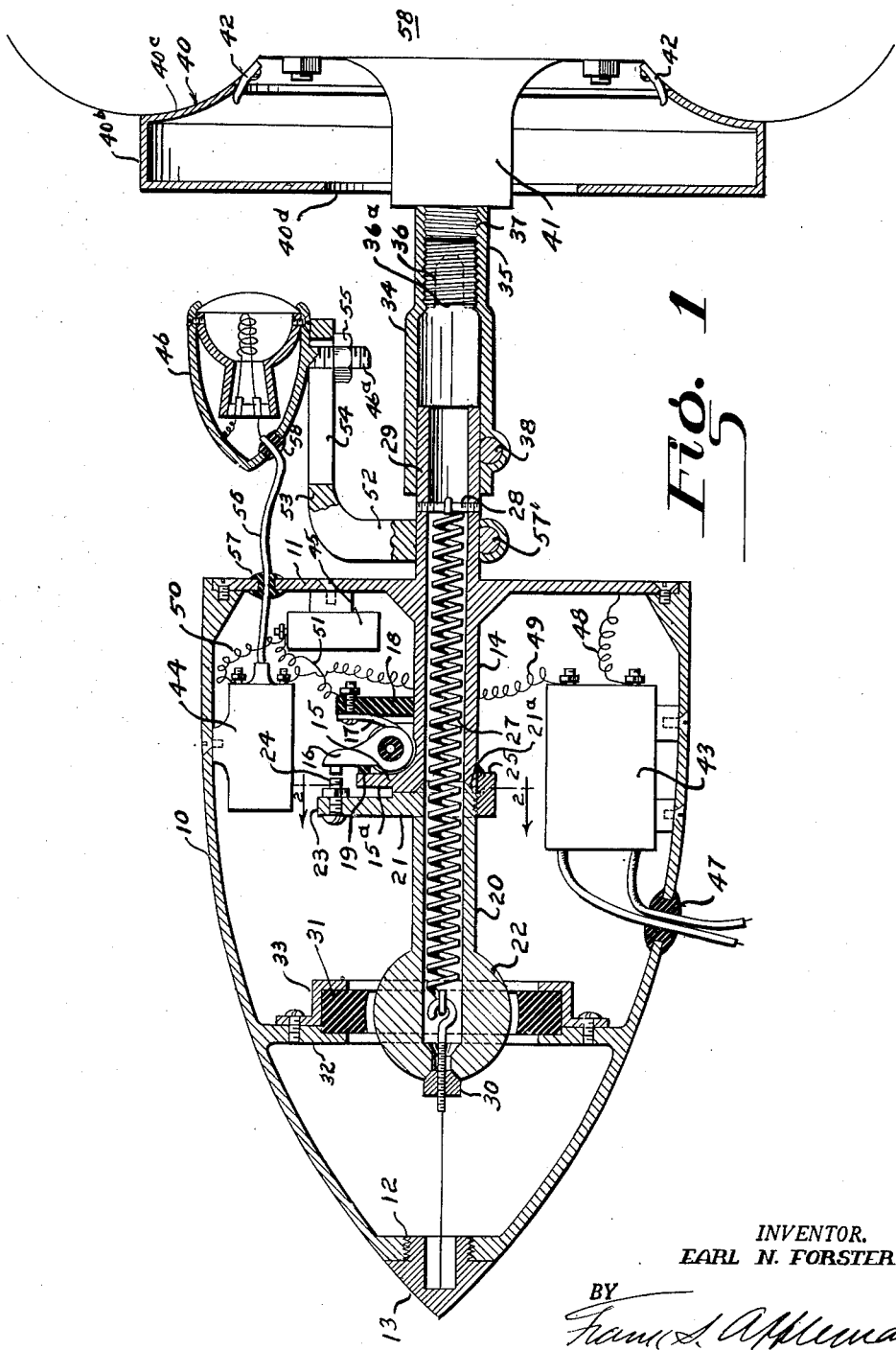
INVENTOR.
EARL N. FORSTER
BY
Frank S. Appleman
ATTORNEY Sept. 12, 1950           E. N. FORSTER           2,522,260
WHEEL BALANCER
Filed Sept. 25, 1946           2 Sheets—Sheet 2
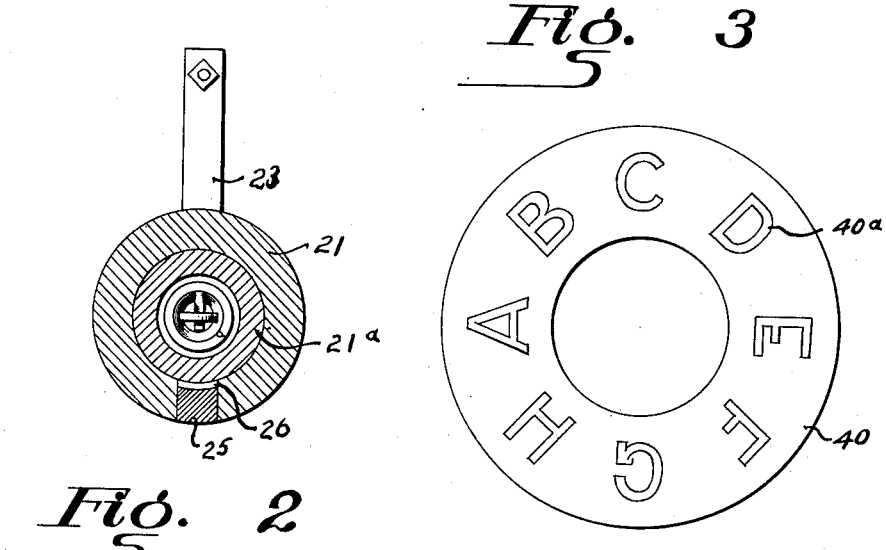
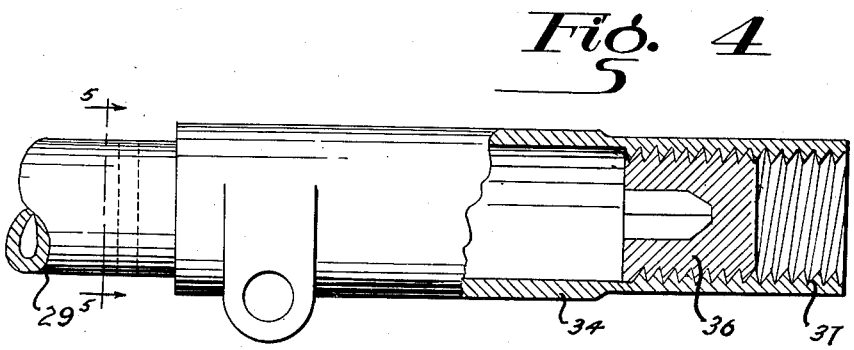
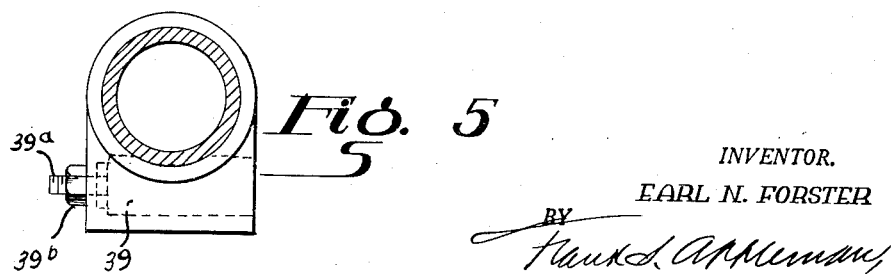
INVENTOR.
EARL N. FORSTER
BY
ATTORNEY.

Patented Sept. 12, 1950

2,522,260

UNITED STATES PATENT OFFICE 2,522,260

WHEEL BALANCER

Earl N. Forster, Lower Lake, Calif.

Application September 25, 1946, Serial No. 699,123

6 Claims. (Cl. 73—66)

This invention relates to a machine and apparatus for testing the balance of wheels such as those of automobiles, and pertains more particularly to certain changes which have been made in connection with the structure disclosed in the patent granted to me March 14, 1944, No. 2,344,349. Fundamentally, the apparatus of the present invention is designed to operate on similar lines to those presented in the said patent, the present improvements being designed to provide for greater efficiency in service and sensitivity in action, certain changes having been made in the parent structure to produce these results.

Wheels, such as those used in motor vehicle service, for example, when in perfect balance, provide smooth running of the vehicle. Such wheels are said to be in "static balance"—their mass moments are uniformly distributed around the wheel axis—and also in "dynamic balance"—the latter includes the conditions relative to "static balance" and, in addition thereto, the mass moments are equally distributed on opposite sides of a central plane perpendicular to the axis. When, however, the wheel is not in perfect balance, both of these conditions may be involved, since the mass moments in such case are not uniformly distributed around the wheel axis nor are they equally distributed on opposite sides of a central plane perpendicular to the axis; when not in balance, the wheel, in service, will tend to "wobble" or create a "shimmy" of the wheel, but will invariably set up the condition of vibration, this condition being generally due to the fact that the heavy part of the wheel, traveling in the circular path, is constantly approaching, reaching and receding within any arc of the path, while the wheel is rotating in such circular path, the arc having its high point on a radius of a circle with the approach extending to such radius and the recession provided after passing such high point; such high point may be considered as the "zenith" or the "nadir" of points in the travel of the heavy portion of the wheel with the condition made practically continuous throughout the rotation, although the effects produced may vary, it having been found that they reach maximum intensity when the "nadir point" is located on a vertical plane extending through the axis, in which case it seems to provide its greatest vibratory effect, so far as the intensity of the vibration is concerned.

This tendency of the vibrations to be maximum when the heavy zone of the wheel is in position at the bottom of the wheel—the "nadir" position—can be understood from the fact that during the approach the weighted zone is being aided by gravity, and when passing the "dead center" position, begins to move in a direction opposing gravity, so that the distinction becomes most pronounced in this position. The approach to dead center and then recession therefrom are present throughout the rotation of the wheel; but, at the sides and at the top the effects set up by gravity differ from those at the bottom—at the sides the gravity action remains constant in direction before and after the dead center point is reached, while at the top the approach is opposed by gravity and aided by gravity after passing dead center. Hence, while there is a tendency of the unbalanced wheel to provide vibrations throughout the complete revolution, the intensity of the vibrations varies, being maximum when the heavy part is passing through the "nadir" point and zone. For this reason, the detecting tests are generally made in such manner that the actual test is of the vibrations at this particular position of the wheel.

Mechanisms, both electrical and mechanical, have been developed with a view to detecting the unbalanced condition as well as to ascertain where the counterbalancing structure is to be supplied.

To provide the detection, it is necessary that the wheel be rotating at a service speed where the maximum intensity of vibration is developed and, in addition, it is necessary in order to determine the value of the intensity, that the vibration effects become individual so as to be able to determine the intensity. Since the wheel must be in motion to produce the vibration, and the latter is to be individually developed to its full extent, the tests are generally made on the basis of a momentary test at a predetermined point during a single rotation of the wheel, with the wheel rotating at a speed such that the vibration can pass through its cycle unaffected by other vibrations during the period of time required to make the single revolution. Such speed is generally known as the "speed of resonance". The latter speed is found in practice either by raising the speed of rotation to a maximum and then permitting the speed to be gradually reduced until the resonance zone is reached, or the speed of rotation may be gradually increased until such zone is reached; both methods are practiced.

Various ways of detecting the presence of the vibrations have been contemplated, among these is the mechanical form disclosed in my prior patent above identified. In this, the machine is mounted adjacent the wheel to be tested, the chassis of the vehicle being raised to permit the wheel to run free, with the wheel driven by a suitable motor-operated device which cooperates with the tread of the wheel. The machine itself is connected to the hub zone of the axle in such manner that the vibrations applied to the axle will be transmitted to the mechanism, the latter being of a form such as will amplify the vibrations and thus permit the operation of a suitable lamp, the circuit of which is to be momentarily closed by the action of a weighted arm which is given an oscillatory movement by the vibrations.

Specifically, the vibratory arm has its axis aligned with the spindle axis and is a continuation of a hollow member which is carried by the machine frame, the weighted member and its stem being hollow so as to provide for an internally located spring which is adjustable as to tension, the two members, the axes of which are aligned with that of the wheel axle spindle, with the spring designed to maintain such alignment in the absence of vibration are subjected to the developed vibrations, the vibration being amplified by the stationary member with such amplification active to cause the weighted member to swing against the tension of the spring; by adjusting the tension of the spring, the extent of swing of the weighted member can be controlled so that only vibrations of the maximum desired intensity will provide the circuit closing action for the lamp, such closing being but momentarily, since the spring is active to break the lamp circuit by restoring the normal positions. The spring also normally holds the two members in end contact, but in permitting the weighted member to swing, the enlarged abutting ends of the members are moved relatively to each other by the swing of the weighted member vertically (with the pivot point at the top of the opposing faces) by the vibrating action; the make and break device of the circuit is in the form of a pair of contacts carried by the respective ends of these members and located above the members, the result being that while vibrations can produce rocking of the weighted member at its enlarged end whenever vibrations are present, the contacts will be closed only when the rocking is made manifest at one point in the revolution of the wheel, viz: when the weighted member swings upwardly in a vertical path which corresponds to the actual "nadir" position of the heavy portion of the wheel; when the weighted member is swung in other directions, the contact points do not come into actual engagement.

The earlier form also carried an indicator which was placed on the wheel itself, the face of the indicator carrying a circular arrangement of distinguishing indicia—such as a circular arrangement of alphabetical letters. Since the indicator is rotating with the wheel, the momentary flashing of the lamp will illuminate that letter which may be opposite the lamp at the instant of illumination, so that the letter will be "spot lighted," and thus indicate the position the indicator had at the instant the circuit was closed. Obviously, this will represent the point at which the heavy zone of the wheel was in the vertical plane and therefore in the actual "nadir" position, and the point where corrective measures are to be applied to the wheel, can be located by considering the letter diametrically opposite that which was "spot lighted."

One of the conditions that is present with detectors for this purpose and which utilize the "spot light" effect is the fact that it is inevitable that a lag is present in the responsiveness to the vibratory action—this is evident from the fact that the wheel is in constant rotation while the action of the device is intermittent; since the mechanism involves movements of parts in order to close the circuit for the lamp, the continued rotation of the wheel would set up the conditions of lag if the detecting structure were operative to close the circuit at but a fixed point in the rotation. This condition is met in practice by the fact that since the movement of the heavy part of the wheel is through a circular path, it is apparent that during the approach and later recession from the selected vertical position, there will be vibratory action, which will tend to increase the intensity during the approach to such position, and a gradual lessening of the intensity during the recession. Hence, the position tends to take on the characteristics of a zone, rather than a point, thus tending to offset the condition of lag referred to.

However, since vibratory action actually continues throughout the circular path, but with varying intensity, this condition can affect the operation of the detecting mechanism, especially where the unbalanced condition is more or less of major value and thus provide for greater intensity. With mechanism such as disclosed in said earlier patent in which the two tubular portions have their enlarged ends in planar facial contact with the portions directly connected only by the spring, it is apparent that the continued vibration action could set up movements of the weighted member in different directions as the heavy portion of the wheel advanced in its circular path; such action could have the effect of possibly shifting the weighted member face out of exact alignment with that of the face of the stationary member and since one of the members of the make and break device of the circuit is carried by such weighted member, it is possible that a shifting of the faces relative to each other could become sufficiently great as to move the contact member carried by the weighted member out of alignment with the stationary contact, in which case the circuit to the lamp would not be completed in presence of the vibrations set up by an unbalanced wheel. One of the purposes of the present invention is to overcome this condition.

Another of the conditions that are present with mechanisms of this general type is the fact that the detecting mechanism must be so secured to the axle spindle of the wheel being examined as to assure the proper transmission of vibrations from the axle to the mechanism. As is apparent, the only point at which a positive connection capable of transmitting vibrations could be applied to the axle is through the threaded end of the axle which normally carries the hub cap; since the wheel must remain in its position, only the hub cap can be removed. Hence, the connection between the actual detecting mechanism and the axle spindle is required to present a positive vibration-communicating path to the mechanism but must do so in presence of the vibrations themselves which could tend to provide for loosening of the connection. The latter becomes more of a possibility through the fact that while the mechanism is designed to detect vibrations in only a small zone of the wheel rotation, vibrations are present throughout the path of rotation, differing only as to intensity, so that the connection is being constantly subjected to vibratory effects made applicable in all directions, with the variations in intensity themselves becoming sources of possible difficulty. The changes made by the present invention over the earlier structure are provided with a view to more efficiently maintaining the integrity of the connection under the above conditions.

Other changes have been made in the present structure—changes which will be hereinafter referred to—and are designed to aid in increasing the efficiency and sensitivibility of the detecting mechanism and to render the same of increased value in this particular field.

To these and other ends, therefore, the nature of which will be better understood as the invention is hereinafter disclosed, said invention consists in the improved constructions and combinations of parts hereinafter more particularly described, illustrated in the accompanying drawings, and more particularly pointed out in the appended claims.

In the accompanying drawings, in which similar reference characters indicate similar parts in each of the views:

Fig. 1 is a longitudinal sectional view taken through the body of the detecting device with the latter shown as in position on the spindle of a wheel which is undergoing tests for unbalanced conditions;

Fig. 2 is a detail sectional view taken on line 2—2 of Fig. 1;

Fig. 3 is a face view of the indicating mechanism;

Fig. 4 is a detail view, partly in elevation and partly in section of the connections between the detecting mechanism and the spindle; and Fig. 5 is a detail sectional view taken on line 5—5 of Fig. 4.

In the present disclosure, the invention is disclosed on a somewhat larger scale than in the disclosure of the patent above identified and, as a result, the complete disclosure is not presented herein in the form shown in the patent; however, the parts thus omitted are designed to be employed in connection with the invention, the particular arrangement thereof and the disclosure shown in Fig. 1 being in the patent. The particular features which are omitted are the support or pedestal for the body of the mechanism, and the mechanism for rotating the wheel on its axis, the wheel itself being but partially shown because of the larger scale presented in the present disclosure.

As in the patent, the body 10 which contains the testing mechanism, is of hollow form and pointed at its rear end, the external contour being changed at the front portion, the latter being located at the point of substantially maximum diameter, the contour in longitudinal section being curved from the front end to such rear point, conforming in this respect to the patent disclosure. The body or shell is preferably formed in two halves as in the patent, to enable ready production and assembly, the divisional line between the halves extending in a horizontal plane. The front end 11 of the body is of circular plate-like form and is secured to the open end of the assembled shell. The shell additionally differs from the patent disclosure in that its rear end is truncated and formed with a threaded opening 12 to receive an end plug 13 which is shaped to complete the pointed end referred to; the opening 12 permits inspection of the interior of the body upon removal of the plug 13.

As in the patent, the front end plate 11 supports a two-part hollow structure having its axis aligned with the axis of plate 11, the axis of the latter being designed to be aligned with the axis of the spindle upon which the wheel is mounted. One of these parts 14 is preferably formed integral with plate 11 and extends rearwardly for a material distance, corresponding in this respect with the disclosure of the patent. The rear end of such hollow member 14 is formed with an annular flange 15, and is designed to support one of the contacts—indicated at 16—of the circuit make and break structure heretofore referred to, contact member 16 being mounted in insulated relation to member 14, and is generally designed to be normally stationary; member 16 extends in an upward direction relative to the axis of member 14 and is external of the latter member—it is designed to be cooperative with a finger 17 carried by an insulating block 18 located forward of member 16, finger 17 being designed to be connected up to a source of current supply hereinafter more fully described in detail. Contact member 16 may be formed yieldable by a suitable spring mounting (not shown) which tends to move the contact point rearwardly; however, such rearward movement is limited by the projecting portion 15a rising from the flange 15 and carrying an insulating pad 19, thus maintaining the insulated relationship of contact member 16 relative to the member 14.

The second part 20 is also provided with a flange 21 cooperating with flange 15. Member 20 extends rearwardly and terminates in a weighted member 22; members 20 and 22 are hollow, the rear portion of member 22 having the dimensions of the hollow zone reduced, for a purpose to be presently described. Flange 21 also carries an upstanding arm 23 equipped with a contact point 24 which cooperates with the contact member 16.

For the purpose of preventing relative rotative movement of the two contact points to avoid misalignment of such points, the two flanges are arranged to provide an interlocking effect below the main tubular portions of members 14 and 20; a similar relationship is presented in the patent, but in the present invention it is provided by a lug 25 carried by the flange 15 and extending into a recess or slot 26 of the other flange, thus locking the two flanges against relative rotation, but permitting relative movement of the flanges in a direction to separate them.

The members 14 and 20 are normally held with their flanges 15 and 21 in facial contact by a spring 27, the front end of which is anchored to a member 28 carried by the forwardly projecting end 29 of member 14, the rear end of the spring being connected to an adjusting mechanism indicated generally at 30, the spring extending longitudinally of the hollow space within the two members. This is generally similar to the structure of the patent, the spring tension being provided by proper adjustment of the mechanism 30.

As will be understood, the spring provides a yieldable connection between the two members 14 and 20, with member 14 permanently positioned, while member 20 can move by separation of the contacting flange faces. Such movement of member 20 is provided by the vibrations which are communicated to flange 21 from flange 15 during such contact. During the development of a vibration, the effect is made manifest on member 14, as presently described, the flange 15 of the latter transmitting the action to flange 21, and since the power of the vibrations will be greatest in alignment with the specific location of the heavier zone of the wheel, the tendency will be to rock member 20 with the pivoting point for the rocking action found at the periphery of the two flanges. For instance, if the heavier portion is at the bottom in Fig. 1, the tendency will be to rock member 20 with the rocking pivot at the top of the contacting flanges, the rocking point thus being opposite the point of greater action provided by the heavier portion of the wheel; as the wheel rotates, this condition follows the movement of the heavier portion of the wheel during its travel in the circular path.

In the patent, the opposing faces of the flanges are both planar, and it is possible therein that this continued rocking of member 20 could set up a displacing action of the flange of member 20 sufficient to destroy the proper alignment between the opposing contacts of the circuit make and break structure which is being made operative by the movements of member 20—while relative rotative movement between the members would be prevented by the bottom loose connection shown in the patent, the latter must be such as to permit the free rocking action, and hence it would be possible for member 20 to bodily shift laterally sufficient to produce the misalignment.

To avoid this condition, the opposing faces of flanges 15 and 21 of the present invention are formed in their inner zones with a complemental conical formation, the cone portion being preferably carried by member 20 with the complemental recess carried by member 15, the conical member being indicated at 21a. As a result, each time member 20 is rocked with resultant return by spring 27, the cone 21a will force the two flanges into true alignment with the contact points always properly positioned relative to each other as to alignment, lug 25 preventing relative rotation between the two flanges while permitting such rocking action.

Cooperating with the weighted member 22 is an annular cushioning member 31 carried by a support formed by an inwardly extending flange 32 carried by the walls of shell 10 and an annular cover 33 secured to the flange as indicated in Fig. 1. Member 31 will cushion the movement of the weighted member, regardless of its direction of swing. This structure differs from that of the patent, wherein the shell 10 carries isolated cushions which would cushion the movement of member 20 in a vertical direction but not otherwise.

While the weighted member 22 would tend to have its swinging movements throughout the rotation of the wheel, due to the travel of the weighted portion of the wheel in a circular path, the value of the several swings will be likely to vary for the reasons heretofore pointed out, being maximum when the weighted portion of the wheel is in its lower position within the path, a condition which would cause the weighted member 22 to swing upward on an axis provided by the peripheral edges of the flanges 15 and 21 with the swinging axis at the top; when swung in this position, the extension 23 will be moved to advance contact 24 into contact relation to the contact point carried by member 16, thus closing the circuit, presently described. When the weighted member rocks in directions other than such lower zone, the movements are such that no contact is made between contact 24 and the contact on member 16. Hence, while the weighted member 20 may be under substantially constant movement, due to the vibrations set up by the unbalanced wheel in traversing the circular path, only those vibrations which take place within the lower zone of such path are made effective in closing the circuit at the make and break point provided by such contacts, with the result that the circuit is established for a brief period once during each rotation of the wheel being tested.

The vibrations are communicated to the mechanism by the use of an adapter structure which is connected both with the extension 29 of member 14 and with the spindle of the axle on which the wheel is rotating. The present adapter structure differs somewhat from that disclosed in the patent, and is designed to provide for a more efficient transmission of the vibrations from such spindle to extension 29. The structure of the adapter and the manner of its mounting will now be described:

The adapter is in the form of a shell 34 having its rear portion enlarged sufficiently to receive extension 29 and having its forward portion reduced and internally threaded, as at 35 to fit the thread zone of the spindle, and also to receive a jamb nut 36, which, in practice, is threaded into contacting engagement with the threaded end 37 of the spindle. Since both ends of the shell are thus closed, and it is necessary to provide the jamb nut contact with the spindle, the adapter is placed in position by the following regimen:

With the wheel mounted to be rotated and with the thread zone of the spindle exposed, the shell 34, independent of the detecting mechanism, is threaded onto such threaded end 37 to provide an efficient connection between the shell and the spindle end. The operator then inserts a suitable tool (not shown) through the open end of the shell into the non-circular opening 36a of the jamb nut, and threads the nut into tight engagement with the end of the spindle. The detecting mechanism is then positioned by advancing extension 29 into the rear zone of the shell, as shown in Fig. 1, for instance, and is anchored therein through the use of a pin assembly 38, shell 34 carrying an opening to receive the pin with the direction of length of the latter extending transversely to the direction of length of the shell. The pin assembly is in the form of a pin 39 having at one end a projecting threaded extension 39a; the vertical diameter of the pin normally is such that it would extend into the path of extension 29; to provide for the proper assemblage of the parts, a preliminary activity is provided by placing the pin within the shell opening prior to the admission of extension 29, the upper zone of the pin at such time extending across the shell opening which is to receive extension 29; a reaming tool then is employed to restore the normal circular contour of the interior of the shell by reaming out that portion of the pin which projects into the shell interior. The pin is left in such position and extension 29 then inserted into position, after which a nut 39b is placed on extension 39a, and the pin drawn in its direction of length by tightening the nut 39b, with the result that a portion of the arcuate face provided by the reaming operation is drawn into tight contacting relationship with the extension to produce a strong frictional component between them, thus positioning the detecting mechanism into anchored relation with the adapter.

As will be understood, the adapter mechanism thus described will produce a very rigid assemblage between the extension 29 and the spindle end 37 with the arrangement such that all of the several parts are so firmly positioned relative to each other that any vibrations which may be produced upon the axle and its spindle will be completely transmitted to the detecting mechanism and tend to become amplified during such transmission. This will tend to provide for vibratory effects on the end portion 11 and the structures directly connected therewith, but these effects do not materially affect the operation, excepting to provide for the transmission of the vibrations from flange 15 to flange 21, to set up the movements of the weighted member 22 heretofore described.

Another change made by the present invention over the disclosure of the patent is that of the mounting of the indicator 40. In the form shown in the drawings—the face of which is disclosed in Fig. 3 which includes the indicia 40a—the structure is in the form of a casing including a peripheral wall 40b and a curved rear portion 40c shaped to fit the contour of a portion of the wheel structure, the front face carrying the indicia and is formed with an opening 40d for the wheel hub, the latter being indicated at 41. The assembly is secured to the wheel by suitable clamping members 42 conveniently attached to the wheel. As a result, the indicator is definitely and positively secured to the wheel body in such manner as to not be affected by any vibratory effects which may be set up.

The electrical system that is employed has its elements similar to those of the patent, these including a transformer 43, a high tension coil 44, a condenser 45 and a neon lamp 46; however, the mounting of these has been changed somewhat to meet space conditions, as well as to provide for more efficient operation.

For instance, the transformer 43 is located at the bottom of the interior of the shell 10 with the latter carrying an insulating bushing 47 for the passage of the cable connecting the source of current supply with the transformer. The transformer is shown as grounded to shell 10 by connection 48.

The coil 44 is secured at the top of the interior of the shell and has a connection 49 with the transformer and another connection 50 with the condenser 45 which is carried by the end plate 11. The connection 51 from the condenser leads to the spring structure 17 to provide current for the make and break device, it being understood that the opposite side of the circuit in the make and brake device is grounded to the frame through flange 21 and flange 15 to member 14.

The lamp 46 is given a different mounting—shown as of a somewhat different form from that of the patent. The lamp body is shown as supported by a bracket 52 which is carried by the external portion 29 of member 14, said bracket having a vertical portion formed with an opening for the passage of said portion 29 and with an angular portion 53 which extends forwardly and is provided with an elongated slot 54 through which a threaded stem 46a of lamp 46 extends and is secured in clamped position by a nut 55, thus permitting the lamp to be adjusted toward and from the indicataor 40 as desired. The lamp is connected with coil 44 by a connection 56, a portion of which is in the form of a cable which extends from the coil through an insulating bushing 57 carried by the end wall 11 and a similar bushing 58 carried by the wall of the lamp, the actual connection within the lamp body being connected with the lamp, and the opposite terminal from the lamp being grounded to the lamp frame. The bracket 52 is anchored to portion 29 by the use of a pin 57' which is similar in structure and formation to pin 38, the two pins having similar structures, operations, and purposes, so that the description relative to pin 38 will apply also to pin 57'.

The wheel is indicated at 58.

As will be understood, the lamp 46 is of a type which, in service, tends to produce the effect of a stroboscope and may obviously be of any preferred form of such structure. The lamp is anchored to the extension 29, as above pointed out, through the arm 52, and is adjustably mounted to permit proper distancing of the lamp from the indicator.

A comparison of the structure disclosed herein with that of the earlier patent, will indicate that many of the features disclosed herein are similar to those of the patent, the above description more particularly emphasizing the differences between the two disclosures. Hence, in the accompanying claims, to avoid unnecessary duplication of elements between the claims of the two disclosures, the present claims present as a concededly old portion of the claims, a terse disclosure of the earlier structure under actual service conditions, the "wherein" clauses of the base claim presenting such structure and are intended to be included as an active part of the claims.

While I have herein shown and described a preferred form of the invention, it will be readily understood that changes and/or modifications therein may be found desirable or essential in meeting the exigencies of service or the individual desires of a user, and I therefore reserve the right to make any and all such changes or modifications as may be so found desirable or essential, insofar as the same may fall within the spirit and scope of the invention as expressed in the accompanying claims, when broadly construed.

I claim:

1. In mechanism for detecting the unbalanced condition of wheels, wherein the wheel is placed in pseudo-service operation and the mechanism placed in positive connection with the wheel spindle to be rendered subject to the vibrations developed by the wheel rotation, wherein the mechanism includes an assemblage operative to produce oscillatory movements of a weighted member by the vibrations emanating from such spindle, and wherein a circuit make-and-break formation is made active to complete a lamp circuit solely during and by weighted member movements in a selected direction of oscillatory movement of the member to thereby render the lamp active momentarily during a revolution of the wheel to "spot light" an indicator carried by and rotating with the wheel, the assemblage of said mechanism including a tubular composite element which includes a relatively-stationary portion and said weighted member with the portion and member each having an end zone flanged and normally extending with aligned axes and with the flanges in opposed contacting relation, and a tension-adjustable spring connecting the portion and member to thereby tend to retain the flanges in such contacting relation, each of said flanges carrying a contact member of the make-and-break formation, said flanges carrying complemental means for preventing relative rotation therebetween and an annular conical element on one of said flanges, the other of said flanges having a conical seat for receiving said conical element to restore axial alignment of the flanges in presence of misalignment produced by vibration activities rendered active on such weighted member, whereby the contact points of the make-and-break formation will be properly aligned when the wheel rotation produces oscillation of the weighted member in the selected direction to thereby render the lamp circuit active to "spot light" the indicator.

2. Mechanism as in claim 1 characterized in that the means for preventing relative rotation between the flanges is in the form of a tongue carried by one flange cooperative with a recess carried by the other flange, with the tongue and recess in the peripheral zone of the flanges and having relative conformations such that the movable member flange may be moved away from the opposite flange by vibration activity.

3. Mechanism as in claim 1 characterized in that the annular conical structure projects from the inner zone of the weighted member flange, the opposing zone of the flange on the relatively stationary portion having an annular groove with its walls complemental to walls of the conical formation, whereby any misalignment of flange axes produced through vibration activity will be immediately restored to align conditions by the spring reaction to a vibration activity through the cooperative action of the conical structure and the complemental groove.

4. Mechanism as in claim 1 characterized in that the assemblage includes an annular support, an annular cushioning member carried by the support and located in the path of weighted member oscillation to prevent oscillation of the weighted member beyond definite limits.

5. Mechanism as in claim 1 characterized in that a contact-carrying member is supported by and insulated from the flange of the relatively stationary portion, said contact carrying member having electrical connection with one side of the lamp circuit, the opposite side of such circuit being grounded through the weighted member flange, whereby the lamp circuit remains broken excepting during periods when the weighted member oscillations reach a definite value and in a predetermined direction to thereby close the circuit through contact of the opposing contacts.

6. Mechanism as in claim 1 characterized in that a contact-carrying member is yieldably supported and insulated from the flange of the relatively stationary portion said contact carrying member having electrical connection with one side of the lamp circuit, the opposite side of such circuit being grounded through the weighted member flange, whereby the lamp circuit remains broken excepting during periods when the weighted member oscillations reach a definite value and in a predetermined direction to thereby close the circuit through contact of the opposing contacts.

EARL N. FORSTER.

REFERENCES CITED

The following references are of record in the file of this patent:

UNITED STATES PATENTS

| Number | Name | Date |
|---|---|---|
| 460,716 | Ferguson | Oct. 6, 1891 |
| 2,004,270 | Davey | June 11, 1935 |
| 2,289,200 | Lundgren | July 7, 1942 |
| 2,341,444 | Hunter | Feb. 8, 1944 |
| 2,344,349 | Forster | Mar. 14, 1944 |